(12) United States Patent
Ding

(10) Patent No.: US 10,582,116 B2
(45) Date of Patent: Mar. 3, 2020

(54) SHOOTING CONTROL METHOD, SHOOTING CONTROL APPARATUS AND USER EQUIPMENT

(71) Applicant: Beijing Zhigu Rui Tuo Tech Co., Ltd, Beijing (CN)

(72) Inventor: Dayong Ding, Beijing (CN)

(73) Assignee: Beijing Zhigu Rui Tuo Tech Co., Ltd, Beijing (CN)

( * ) Notice: Subject to any disclaimer, the term of this patent is extended or adjusted under 35 U.S.C. 154(b) by 22 days.

(21) Appl. No.: 15/197,693

(22) Filed: Jun. 29, 2016

(65) Prior Publication Data

US 2017/0006217 A1 Jan. 5, 2017

(30) Foreign Application Priority Data

Jun. 30, 2015 (CN) .......................... 2015 1 0378186

(51) Int. Cl.
*H04N 5/232* (2006.01)
(52) U.S. Cl.
CPC ....... *H04N 5/23219* (2013.01); *H04N 5/2327* (2013.01); *H04N 5/23251* (2013.01); *H04N 5/23287* (2013.01)
(58) Field of Classification Search
None
See application file for complete search history.

(56) References Cited

U.S. PATENT DOCUMENTS

| 9,720,496 B2 | 8/2017 | Cancel Olmo et al. |
| 2006/0126488 A1 | 6/2006 | Kang |
| 2010/0118141 A1* | 5/2010 | Bouchon-Meunier ...... H04N 5/232 348/135 |
| 2010/0321572 A1 | 12/2010 | Cornett et al. |
| 2013/0066526 A1 | 3/2013 | Mondragon et al. |

(Continued)

FOREIGN PATENT DOCUMENTS

| CN | 1262479 A | 8/2000 |
| CN | 101630495 A | 1/2010 |

(Continued)

OTHER PUBLICATIONS

Office Action dated Nov. 30, 2017 for U.S. Appl. No. 15/197,679, 16 pages.

(Continued)

*Primary Examiner* — Kaitlin A Retallick
(74) *Attorney, Agent, or Firm* — Amin, Turocy & Watson, LLP

(57) ABSTRACT

A shooting control method, a shooting control apparatus and a user equipment are provided. A method comprises acquiring eye movement information related to that at least one eye of a user gazes an image capturing equipment, and adjusting shooting of shooting parameters of the image capturing equipment at least according to a non-saccade eye movement part in the eye movement information. Shooting parameters of an image capturing equipment can be adjusted according to a non-saccade eye movement part of the image capturing equipment gazed by a user, to perform shooting shake compensating on relative movement between the head of the user and the image capturing equipment corresponding to the non-saccade eye movement part.

24 Claims, 7 Drawing Sheets

---

Acquiring eye movement information related to that at least one eye of a user gazes an image capturing equipment — S110

Adjusting shooting parameters of the image capturing equipment at least according to a non-saccade eye movement part in the eye movement information, wherein the shooting parameters related to that the image capturing equipment shoots the user — S120

(56) References Cited

U.S. PATENT DOCUMENTS

| | | | |
|---|---|---|---|
| 2014/0055339 A1* | 2/2014 | Stanasolovich | G09G 5/00 345/156 |
| 2014/0247286 A1 | 9/2014 | Chi | |
| 2015/0168722 A1 | 6/2015 | Cho et al. | |
| 2015/0199559 A1* | 7/2015 | Sztuk | H04N 5/23219 348/78 |
| 2016/0027414 A1 | 1/2016 | Osterhout et al. | |
| 2016/0062118 A1 | 3/2016 | Osterhout | |
| 2016/0189351 A1 | 6/2016 | Holz et al. | |
| 2016/0225192 A1 | 8/2016 | Jones et al. | |
| 2016/0364904 A1 | 12/2016 | Parker et al. | |
| 2016/0373648 A1* | 12/2016 | Tseng | H04N 5/23258 |
| 2016/0378181 A1 | 12/2016 | Nasca | |

FOREIGN PATENT DOCUMENTS

| | | |
|---|---|---|
| CN | 101690165 A | 3/2010 |
| CN | 101754715 A | 6/2010 |
| CN | 101860679 A | 10/2010 |
| CN | 101911176 A | 12/2010 |
| CN | 101930302 A | 12/2010 |
| CN | 102165392 A | 8/2011 |
| CN | 201928352 U | 8/2011 |
| CN | 102214455 A | 10/2011 |
| CN | 101690165 B | 9/2012 |
| CN | 102708843 A | 10/2012 |
| CN | 103123780 A | 5/2013 |
| CN | 103365430 A | 10/2013 |
| CN | 103376892 A | 10/2013 |
| CN | 103384544 A | 11/2013 |
| CN | 103970499 A | 8/2014 |
| CN | 104065880 A | 9/2014 |
| CN | 104320545 A | 1/2015 |
| CN | 104575357 A | 4/2015 |

OTHER PUBLICATIONS

Office Action dated Nov. 30, 2017 for U.S. Appl. No. 15/197,687, 16 pages.
Chinese Office Action for Chinese Application Serial No. 201510378188.8 dated Jul. 17, 2018, 8 pages (English translation unavailable).
Chinese Office Action for Chinese Application Serial No. 201510378187.3 dated Jul. 17, 2018, 7 pages (English translation unavailable).
Final Office Action dated Jul. 6, 2018 for U.S. Appl. No. 15/197,679, 15 pages.
Final Office Action dated Jul. 6, 2018 for U.S. Appl. No. 15/197,687, 15 pages.
Chinese Office Action for Chinese Application Serial No. 201510378186.9, dated Oct. 24, 2018, 6 pages.
Office Action dated Dec. 7, 2018 for U.S. Appl. No. 15/197,679, 13 pages.
Office Action dated Dec. 5, 2018 for U.S. Appl. No. 15/197,687, 16 pages.
Final Office Action dated Jun. 6, 2019 for U.S. Appl. No. 15/197,679, 16 pages.
Final Office Action dated Jun. 6, 2019 for U.S. Appl. No. 15/197,687, 24 pages.
Chinese Office Action dated May 8, 2019 for Chinese Application No. 201510378188.8, 15 pages (including translation).
Feng, "Eye-movement based Human-Computer interaction" Soochow University Press, Apr. 2010, ISBN 978-7-811-37466.7, 15 pages.
Yuan, et al "Computer simulation for human-machine engineering", Beihang University Press, Apr. 2005, ISBN 7-81077-607-X, 16 pages.
Chinese Office Action for Chinese Application Serial No. 201510378187.3, dated Apr. 3, 2019, 20 Pages (with translation).
Chi et al. "Eye Tracking" China Machine Press, Jun. 2011, ISBN 978-7-111-34689.0, 47 pages (with translation).
Non-Final Office Action received for U.S. Appl. No. 15/197,687 dated Aug. 15, 2019, 15 pages.
Non-Final Office Action received for U.S. Appl. No. 15/197,679 dated Aug. 16, 2019, 18 pages.

* cited by examiner

SHOOTING CONTROL METHOD, SHOOTING CONTROL APPARATUS AND USER EQUIPMENT

RELATED APPLICATION

The present application claims the benefit of priority to Chinese Patent Application No. 201510378186.9, filed on Jun. 30, 2015, and entitled "shooting control method, shooting control apparatus and user equipment", which application is hereby incorporated into the present international PCT application by reference herein in its entirety.

TECHNICAL FIELD

The present application relates to the field of information processing technologies, and, for example, to a shooting control method, a shooting control apparatus and a user equipment.

BACKGROUND

During use of a user equipment, especially a portable handheld device such as a mobile phone, when a user is in a moving state such as walking or taking a public vehicle, the user equipment may often move relative to the head of the user due to bumping, thus bringing about some bad experience to the user gazing the user equipment. For example, when a user performs selfie by a selfie camera on the user equipment, a bad shooting effect such as fuzzy image is generated due to movement of the user equipment relative to the head of the user.

SUMMARY

An example, non-limiting objective of one or more example embodiments of the present application is: to provide a shooting control scheme.

In a first aspect, an example embodiment of the present application provides a shooting control method, comprising:

acquiring eye movement information related to that at least one eye of a user gazes an image capturing equipment; and adjusting shooting parameters of the image capturing equipment at least according to a non-saccade eye movement part in the eye movement information, wherein the shooting parameters related to that the image capturing equipment shoots the user.

In a second aspect, an example embodiment of the present application provides a shooting control apparatus, comprising:

an eye movement information acquisition module, configured to acquire eye movement information related to that at least one eye of a user gazes an image capturing equipment; and a shooting parameter adjustment module, configured to adjust shooting parameters of the image capturing equipment at least according to a non-saccade eye movement part in the eye movement information, wherein the shooting parameters related to that the image capturing equipment shoots the user.

In a third aspect, an example embodiment of the present application provides a user equipment, the user equipment comprising:

an image sensor, configured to collect an image;
a memory, configured to store a program; and
a processor, configured to execute the program stored by the memory, the program causing the processor to perform the following operations of:

acquiring eye movement information related to that at least one eye of a user gazes a user equipment; and adjusting shooting parameters of the image sensor at least according to a non-saccade eye movement part in the eye movement information, wherein the shooting parameters related to that the image capturing equipment shoots the user.

In a fourth aspect, an example embodiment of the present application provides a user equipment, the user equipment comprising:

a memory, configured to store a program; and
a processor, configured to execute the program stored by the memory, the program causing the processor to perform the following operations of:

acquiring eye movement information related to that at least one eye of a user gazes an image capturing equipment; and adjusting shooting parameters of the image capturing equipment at least according to a non-saccade eye movement part in the eye movement information, wherein the shooting parameters related to that the image capturing equipment shoots the user.

According to at least one of the example embodiments of the present application, shooting parameters of an image capturing equipment are adjusted according to a non-saccade eye movement part of the image capturing equipment gazed by a user, to compensate shooting shake caused by relative movement between the head of the user and the image collecting device corresponding to the non-saccade eye movement part, thus improving the user's shooting experience in a scenario of having relative movement with the image capturing equipment.

DETAILED DESCRIPTION

Figure 1:
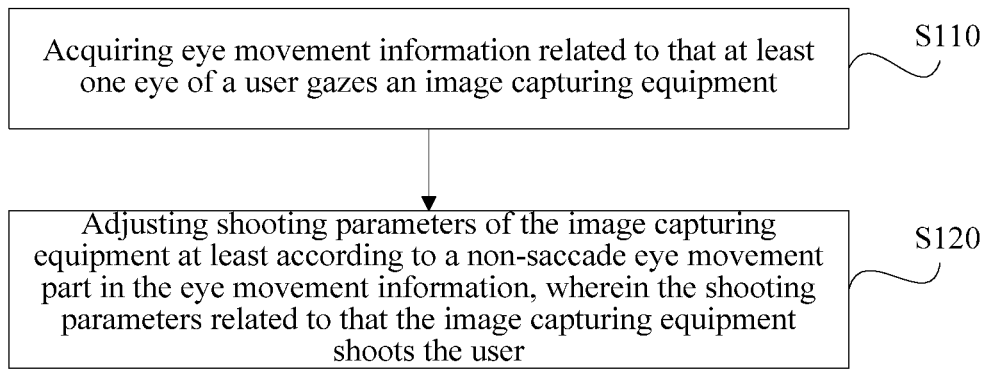
FIG. 1 is a flowchart of a shooting control method according to an example embodiment of the present application.

Example embodiments of the present application are further described below in detail with reference to the accompanying drawings (in which like elements are denoted by like reference numerals) and embodiments. The following embodiments are used for describing the present application, but are not intended to limit the scope of the present application.

A person skilled in the art may understand that the terms such as "first" and "second" in the present application are used only to differentiate different steps, devices, modules, or the like, and neither represent any specific technical meaning, nor indicate any necessary logical relationship between the terms.

In a process that a user is in a moving state or on an object (e.g., a vehicle) is in a moving state, when the user performs selfie by an image capturing equipment such as a cellphone or a smart watch, the image capturing equipment may often move relative to the head of the user due to bumping movement, thus causing a bad effect to the selfie, for example, a fuzzy shot image or image composition deviation.

As shown in FIG. 1, one example embodiment of the present application provides a shooting control method, comprising:

S110: acquiring eye movement information related to that at least one eye of a user gazes an image capturing equipment; and S120: adjusting shooting parameters of the image capturing equipment at least according to a non-saccade eye movement part in the eye movement information, wherein the shooting parameters related to that the image capturing equipment shoots the user.

For example, the shooting control apparatus according to the present application is used as an execution body of the present equipment, to perform S110-S120. Specifically, the shooting control apparatus may be disposed in a user equipment through software, hardware or a combination of software and hardware, or the shooting control apparatus per se is the user equipment; and in one possible implementation scheme, the user equipment is the image capturing equipment. In another possible implementation scheme, the user equipment comprises, but is not limited to, a smartphone, a tablet computer, a smart watch, smart frame glasses, a smart helmet and the like.

According to example embodiments of the present application, shooting parameters of an image capturing equipment are adjusted according to a non-saccade eye movement part of the image capturing equipment gazed by a user, to compensate shooting shake caused by relative movement between the head of the user and the image collecting device corresponding to the non-saccade eye movement part, thus improving the user's shooting experience in a scenario of having relative movement with the image capturing equipment.

The steps of the embodiment of the present application are further described through the following example embodiment:

S110: Acquiring eye movement information related to that at least one eye of a user gazes an image capturing equipment.

Herein, the at least one eye may be one eye of the user; or may also be two eyes of the user.

In one example embodiment, the gazing the user equipment, for example, may be: gazing contents displayed by a displaying module on the image capturing equipment, for example, a selfie preview displayed by the displaying module and the like.

In another example embodiment, the gazing the user equipment, for example, may be: gazing physical components on the user equipment, for example, a lens of a selfie camber on the user capturing equipment.

In one example embodiment, beside the shake caused by bumping, the head basically has no other active actions (e.g., rotate), at this point, the eye movement information comprises first movement information related to movement of the at least one eye in a corresponding eye socket.

In another example embodiment, the head of the user may also actively perform other actions, at this point, in addition to the first movement information, the eye movement information may further comprise second movement information related to movement of the head of the user.

In one example embodiment, optionally, S110 may comprise: capture the eye movement information through an eye movement information capturing module.

In one example embodiment, the eye movement information capturing module, for example, may be an image capturing module towards the user's eyes, configured to capture an image of the at least one eye of the user, and obtain the eye movement information through image analysis (e.g., the position of the pupil in the eye socket).

In another example embodiment, the eye movement information capturing module, for example, may comprise an Electro-Oculogram (EOG) signal capturing module disposed on the at least one eye of the user. At this point, the eye movement information, for example, may be EOG information; or may be movement information of the at least one eye obtained according to the EOG information.

In one example embodiment, optionally, it is possible to capture the eye movement information at the side of the image capturing equipment. For example, it is possible to capture an image of the at least one eye through an eye-facing camera on the image capturing equipment.

In another example embodiment, optionally, it is possible to capture the eye movement information at the side of the user's eye. For example, it is possible to capture an image of the eye movement information through an eye-facing camera or EOG detecting module on a wearable device of the user.

In another example embodiment, optionally, S110 may further comprise: acquiring the eye movement information from at least one external device through a communication module. For example, the eye movement information is acquired from the image capturing equipment or the wearable device described above.

S120: adjusting shooting parameters of the image capturing equipment at least according to a non-saccade eye movement part in the eye movement information, wherein the shooting parameters related to that the image capturing equipment shoots the user.

In a process that the user observes an object daily, eye movement usually comprises three types:

saccade eye movement, eye movement in a process that the user's eye changes from one observed object to another observed object, characterized by great angular velocity and angular acceleration and visual processing suspension in the process;

fixation eye movement, an action of the corresponding eye when the user's eye observes an object stationary relative to the user (in the process, the user's eye is not moving, and in the implementation manner, the non-movement serves as a special example of movement); and smooth pursuit eye movement, movement of the eye in the process that the user's eye tracks and observes an objective moving relative to the user; compared with the saccade eye movement, the eye movement corresponding to the smooth pursuit eye movement is gentler.

Where in the fixation eye movement and the smooth pursuit eye movement are eye movement corresponding to that the user intentionally gazes an object.

When a user gazes a user equipment, if his/her eye movement information comprises the fixation eye movement and/or the smooth pursuit eye movement described above, it indicates that the user is intentionally gazing an object on the user equipment. In the process, if the user equipment makes relative movement relative to the head of the user, this may be embodied in the user's eye movement information. Therefore, in the embodiment of the present application, adjustment of the shooting parameters corresponding to the relative movement is determined by using the non-saccade eye movement part in the eye movement information.

In one example embodiment, optionally, the non-saccade eye movement part comprises: a smooth pursuit eye movement part corresponding to the smooth pursuit eye movement in the eye movement information.

For example, in one possible application scenario, a user gazes a static object on the image capturing equipment, for example a lens of a camera, when the user is static relative to the image capturing equipment, the user's eye movement information should only comprise a fixation eye movement part and a saccade eye movement part. Once the head of the user moves relative to the image capturing equipment, the static object moves relative to the head of the user, the original fixation eye movement part becomes a smooth pursuit eye movement part. Therefore, in one example embodiment, S120 can obtain relative movement of the head of the user relative to the image capturing equipment only according to the smooth pursuit eye movement part and adjust the corresponding shooting parameters.

In another example embodiment, optionally, the non-saccade eye movement part comprises: a smooth pursuit eye movement part corresponding to the smooth pursuit eye movement in the eye movement information, and a fixation eye movement part corresponding to the fixation eye movement in the eye movement information.

For example, in one possible application scenario, the user gazes a selfie preview image displayed by the image capturing equipment, a moving object possibly exists in the selfie capturing image. Therefore, in a situation where the head of the user is static relative to the image capturing equipment, the user's eye movement information may also comprise a smooth pursuit eye movement part, at this point, the relative movement information cannot be determined merely relying on the smooth pursuit eye movement part, but the relative movement information needs to be determined by using the smooth pursuit eye movement part and the fixation eye movement part at the same time.

In one example embodiment, optionally, the method may further comprise:

processing the eye movement information to obtain the non-saccade eye movement part.

For example, in another example embodiment, the eye movement information comprises eye rotation angular velocity information, and/or rotation amplitude information and the like; if the eye movement information is processed according to movement features corresponding to the eye movements described above, parts in the eye movement information which correspond to the eye movements can be determined.

In other example embodiments, for example, when the eye movement information comprises EOG information, it is also feasible to obtain EOG feature information corresponding to the eye movements according to pre-learning, and then after the EOG information is obtained, the non-saccade eye movement part in the eye movement information can be obtained by processing the EOG information according to the EOG feature information.

In one example embodiment, optionally, it is feasible to directly adjust the shooting parameters according to the non-saccade eye movement part in the eye movement information.

In another example embodiment, it is feasible to firstly determine relative movement information between the head of the user and the image capturing equipment at least according to the non-saccade eye movement part; and then adjust the shooting parameters according to the relative movement information.

In one example embodiment, optionally, the determining relative movement information at least according to the non-saccade eye movement part comprises:

determining the relative movement information at least according to the non-saccade eye movement part and at least one piece of reference non-saccade eye movement information.

The at least one piece of reference non-saccade eye movement information, for example, may be: a non-saccade eye movement part in the eye movement information acquired by the user through a current gaze action in a condition of being static relative to the image capturing equipment.

In one example embodiment, the determining the relative movement information at least according to the non-saccade eye movement part and at least one piece of reference non-saccade eye movement information, for example, may comprise:

comparing the non-saccade eye movement part with reference non-saccade eye movement information in the at least one piece of reference non-saccade eye movement information which corresponds to the eye movement information, to determine the relative movement information according to their difference.

In one example embodiment, optionally, the determining relative movement information at least according to the non-saccade eye movement part may further comprise:

determining the relative movement information at least according to the non-saccade eye movement part and movement information of the image capturing equipment corresponding to the non-saccade eye movement part.

In the example embodiment, before the determining relative movement information at least according to the non-saccade eye movement part, the method may further comprise: acquiring the movement information.

Herein, the movement information, for example, may be at least one inertial sensing information of the image capturing equipment, and it is feasible to acquire the information through at least one inertial sensor of the image capturing equipment. The at least one inertial sensor, for example, may comprise at least one of the following:

at least one acceleration sensor, at least one gyroscope, at least one magnetic sensor, at least one gravity sensor and the like.

The movement information, for example, may comprise the at least one inertial sensing information captured by the at least one inertial sensor.

In one example embodiment, when the execution body of the shooting control method is located at the side of the image capturing equipment, the acquiring the movement information may further comprise:

acquiring the movement information by at least one inertial sensor of the image capturing equipment.

In another example embodiment, when the execution body is not located at the side of the image capturing equipment, the acquiring the movement information may further comprise:

acquiring the movement information from at least one external device through communication.

The at least one external device, for example, may comprise the image capturing equipment.

In one example embodiment, optionally, the determining the relative movement information at least according to the non-saccade eye movement part and movement information may comprise:

determining eye movement components of the non-saccade eye movement part corresponding to at least one movement feature of the movement information; and determining the relative movement information at least according to the eye movement components.

In one example embodiment, the at least one movement feature may comprise at least one of the following:

movement change frequency feature, movement change amplitude feature and movement change phase feature.

For example, in one example embodiment, optionally, the determining relative movement information at least according to the non-saccade eye movement part may comprise:

determining a part where eye movement information change frequencies in the non-saccade eye movement part match movement change frequency feature of the movement information; the difference between this part of the non-saccade eye movement part and eye movement information that the movement information should corresponding to is the corresponding part of the relative movement information.

According to the embodiment of the present application, through the example embodiments described above, it is feasible to determine relative movement information between the user and the user equipment more accurately, and the relative movement information can be configured to eliminate or reduce bad effects brought about by the relative movement on the user's reading the shooting content.

In one example embodiment, the shooting parameters corresponding to shooting the user, for example, may be the shooting parameters of the user for selfie by the image capturing device.

For example, the user performs selfie by the image capturing equipment such as a smartphone by holding or tools for example a selfie rod.

In another example embodiment, the shooting parameters corresponding to shooting the user, for example, may be the shooting parameters corresponding to shooting the user by other users using the image capturing equipment.

In one example embodiment, the shooting parameters are shooting shake preventing parameters of the image capturing equipment.

For example, in one example embodiment, the image capturing equipment performs shake preventing by a compensating lens. In the present embodiment, the shooting parameters for example can be shifting parameters of the compensating lens, and an effect caused by the relative movement is compensated by shifting of the compensating lens. The shifting parameters of the compensating lens may comprise at least one of a compensating speed, compensating time, a shifting distance and a compensating acceleration of the compensating lens.

In one example embodiment, the image capturing equipment performs shake preventing by an imaging sensor. In the present embodiment, the shooting parameters may be for example shifting parameters of the imaging sensor, for example a Charge-Coupled Device (CCD), and the effect caused by the relative movement is compensated by shifting of the imaging sensor. The shifting parameters of the imaging sensor may comprise at least one of a compensating speed, compensating time, a shifting distance and a compensating acceleration of the imaging sensor.

In other example embodiments, other parameters for relieving the effect caused by the relative movement of the image capturing equipment may also be applied in the present implementation manner. For example, in one example embodiment, the shooting parameters may comprise: a shutter speed, a photosensibility (ISO value) and a focusing manner. For example, in one example embodiment, when the relative movement is more obvious, the photosensibility is higher and the shutter speed is faster.

Of course, in some example embodiments, the image capturing equipment has many shake preventing ways, therefore, the shooting parameters comprise a plurality of above shooting parameters.

The example embodiment is further described through the following application scenario:

In one possible application scenario, a user uses an image capturing equipment to perform selfie on a moving vehicle, wherein bumping movement x(t) of the vehicle is transferred to the image capturing equipment and the head of the user respectively through different links, causing their movements to be different, a movement rule of the shooting module is $y_D(t)$, and a movement rule of the head of the user is $y_H(t)$.

When the user gazes a lens of the image capturing equipment, or a selfie preview image displayed by a displaying module of the image capturing equipment, due to the relative movement between the image capturing equipment and the head of the user, when the user gazes the image capturing equipment with the eye, their movement difference $y_D(t)-y_H(t)$ has to be compensated, causing the original fixation eye movement for the lens or the selfie preview image gazes by the user originally to become frequent smooth pursuit eye movement w(t) at certain amplitude.

To reduce the effect of the relative movement on shooting, it is necessary to eliminate or reduce the movement difference $y_D(t)-y_H(t)$ through a shooting shake preventing technology, to eliminate or reduce the additional smooth pursuit eye movement, for example, to try to achieve an effect of w(t)=0.

In one example embodiment, the method of eliminating or reducing the movement difference $y_D(t)-y_H(t)$ comprises:

adding compensation movement corresponding to the movement difference $y_D(t)-y_H(t)$ to the imaging sensor, to cause effect on an imaging surface caused by movement of the head of the user relative to the image capturing equipment to be eliminated or reduced by the compensating movement of the imaging sensor. For example, when the head of the user moves relative to the image capturing equipment, the image of the head of the user on the imaging surface of the image capturing equipment also moves relative to the relative movement, at this point, in the present embodiment, the compensating movement of the imaging sensor is set to be consistent with the image movement to eliminate or reduce the effect of the relative movement on imaging.

Figure 2:
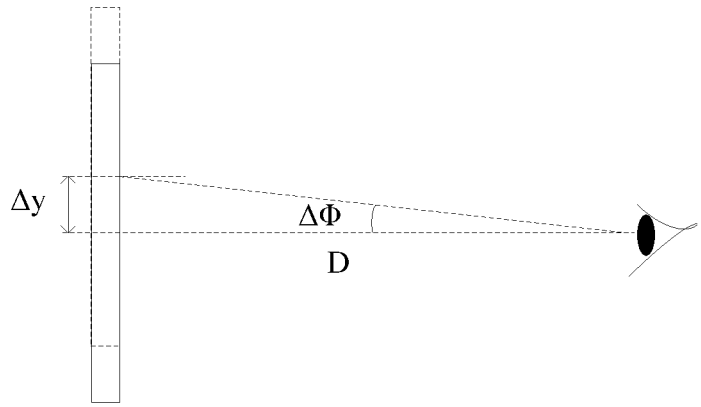
FIG. 2 is a schematic application diagram of a shooting control method according to an example embodiment of the present application.

For example, generally, when a user gazes a camera lens or selfie preview image on a cellphone in a selfie process, as shown in FIG. 2, when bumping occurs during reading, if a gaze point moves a distance of Δy relative to a human eye, the view variation Δφ caused by the gaze point of human eye pursuit shake is:

$$\Delta\varphi=\Delta y/D \quad (1)$$

wherein D is a distance from the eye to the gaze point.

The distance D from the eye to the screen during reading is regarded as a constant, and by calculating a derivative of time for two sides of the formula (1), the following formula can be obtained:

$$\omega = Dv \qquad (2)$$

wherein ω is angular velocity during smooth pursuit eye movement of an eyeball, and v is linear velocity of the gaze point corresponding to the eye. If the gaze point is an object relative to the cellphone, when the eyeball has angular velocity corresponding to the smooth pursuit eye movement in a certain direction, the linear velocity of the cellphone relative to the user may be directly obtained.

According to the linear velocity, a shooting distance and imaging parameters of the camera, shooting parameters such as the compensating speed of the imaging sensor can be obtained.

In one example embodiment, it is feasible to determine compensation for the shooting content at the time of k+1 through smooth pursuit eye movement information of the user acquired at the time of k:

1) in the beginning: compensation speeds in horizontal and vertical directions of the shooting content are both set as 0, that is, $$v_{DH}(t|0) = 0; \ v_{DV}(t|0) = 0$$

2) if horizontal and vertical components of smooth pursuit detected at the time of k are respectively $\omega_H(t|k)$; $\omega_V(t|k)$;

the compensation speeds in horizontal and vertical directions at the time of k+1 are respectively updated as:

$$v_{DH}(t|k+1) = v_{DH}(t|k) - \omega_H(t|k)/D;$$

$$v_{DV}(t|k+1) = v_{DV}(t|k) - \omega_V(t|k)/D;$$

3) if no smooth pursuit is detected at the time of k, $$v_{DH}(t|k+1) = v_{DH}(t|k);$$

$$v_{DV}(t|k+1) = v_{DV}(t|k);$$

The camera can form an imaging record only when a shutter is opened, therefore, after the compensating speed of the imaging sensor is obtained, the compensating speed can be applied to the imaging sensor when the shutter is opened to perform shooting compensating on the compensating acceleration.

Those skilled in the art can see that, the present application performs shooting shake compensating on the relative movement, to further cause the user to still obtain a better selfie image effect when the user moves relative to the image capturing equipment, and improve user experience.

It should be understood by those skilled in the art that, in any one of the foregoing methods of the specific implementations of the present application, the value of the serial number of each step described above does not mean an execution sequence, and the execution sequence of each step should be determined according to the function and internal logic thereof, and should not be any limitation to the implementation procedure of the specific implementations of the present application.

Figure 3:
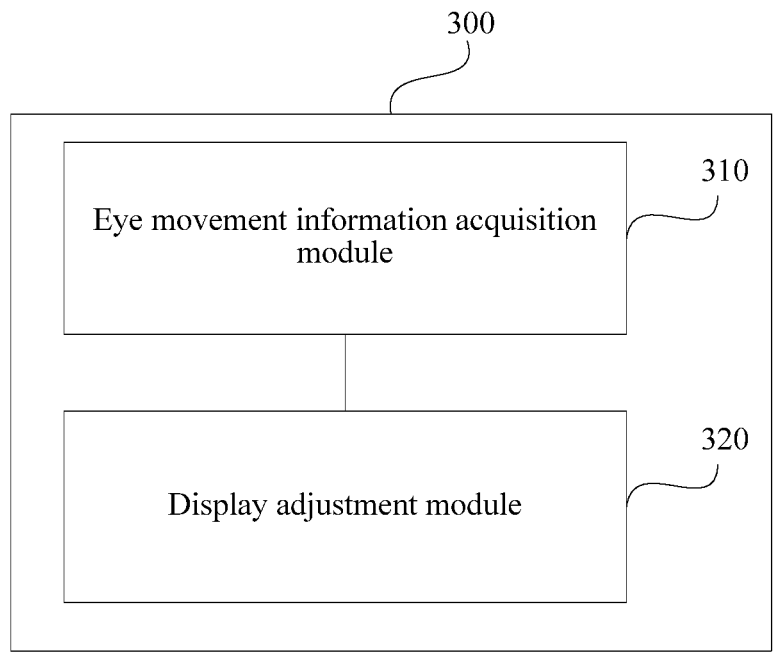
FIG. 3 is a structural schematic block diagram of a shooting control apparatus according to an example embodiment of the present application.

As shown in FIG. 3, one example embodiment of the present application provides a shooting control apparatus 300, comprising:

an eye movement information acquisition module 310, configured to acquire eye movement information related to that at least one eye of a user gazes an image capturing equipment; and a shooting parameter adjustment module 320, configured to adjust shooting parameters of the image capturing equipment at least according to a non-saccade eye movement part in the eye movement information, wherein the shooting parameters related to that the image capturing equipment shoots the user.

According to the implementation scheme in the embodiments of the present application, shooting parameters of an image capturing equipment are adjusted according to a non-saccade eye movement part of the image capturing equipment gazed by a user, to compensate shooting shake caused by relative movement between the head of the user and the image collecting device corresponding to the non-saccade eye movement part, thus improving the user's shooting experience in a scenario of having relative movement with the image capturing equipment.

Modules and units of the embodiment of the present application are further described through the following example embodiment.

In the embodiment of the present application, the at least one eye may be one eye of the user; or may also be two eyes of the user.

In one example embodiment, the eye movement information comprises first movement information related to movement of the at least one eye in a corresponding eye socket.

In another example embodiment, in addition to the first movement information, the eye movement information may further comprise second movement information related to movement of the head of the user.

Figure 4A:
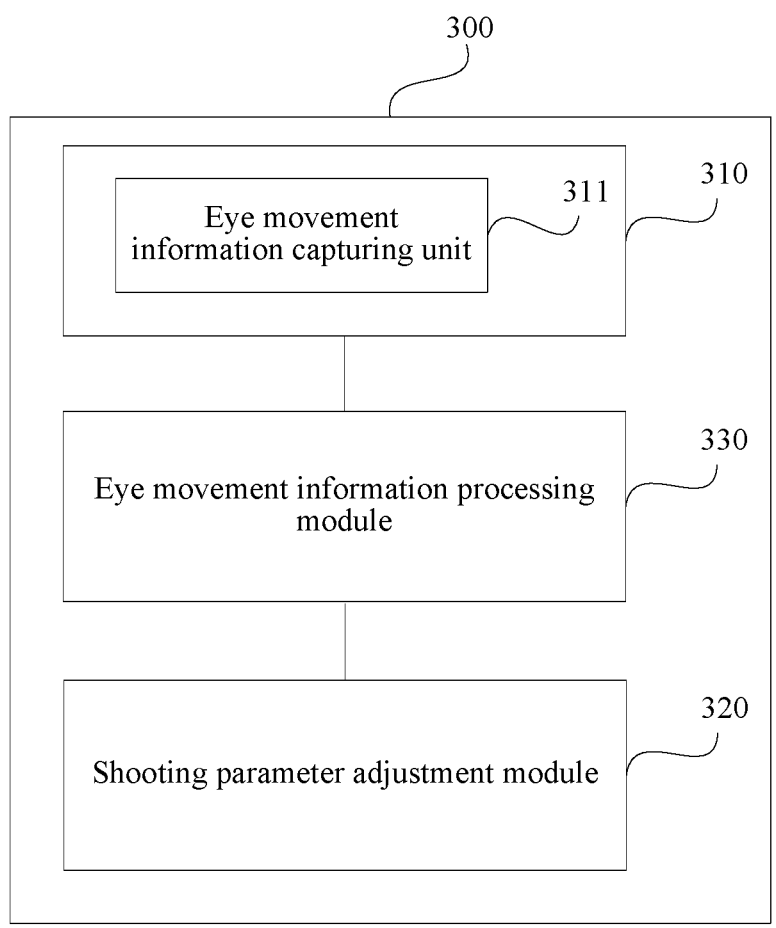
FIGS. 4a-4e are structural schematic diagram blocks of five shooting control apparatuses according to an example embodiment of the present application.

As shown in FIG. 4a, in one example embodiment, optionally, the eye movement information acquisition module 310 comprises: an eye movement information capturing unit 311, configured to capture the eye movement information.

In another example embodiment, optionally, the eye movement information acquisition module 310 comprises: a communication unit, configured to acquire the eye movement information from at least one external device.

As shown in FIG. 4a, in one example embodiment, optionally, the apparatus 300 may further comprise:

an eye movement information processing module 330, configured to process the eye movement information to obtain the non-saccade eye movement part.

As described in the embodiment shown in FIG. 1, in one example embodiment, the non-saccade eye movement part may comprise: a smooth pursuit eye movement part. In example embodiment, the non-saccade eye movement part may further comprise: a fixation eye movement part.

In one example embodiment, optionally, the shooting parameter adjustment module 320 may directly adjust the shooting according to the non-saccade eye movement part in the eye movement information.

Figure 4B:
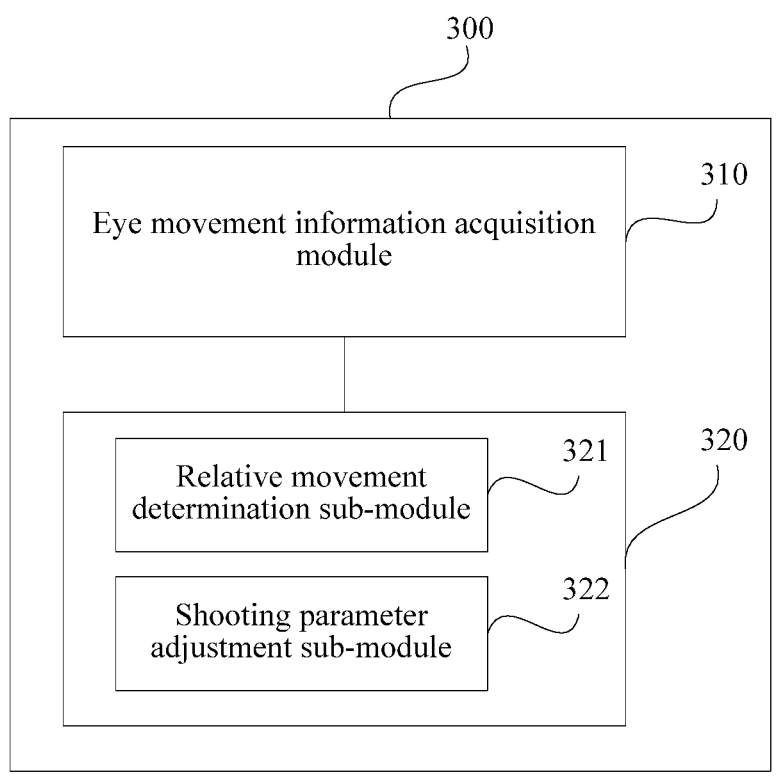

In another example embodiment, as shown in FIG. 4b, optionally, the shooting parameter adjustment module 320 may comprise:

a relative movement determination sub-module 321, configured to determine relative movement information between the head of the user and the image capturing equipment at least according to the non-saccade eye movement part; and a shooting parameter adjustment sub-module 322, configured to adjust the shooting parameters according to the relative movement information.

Figure 4C:
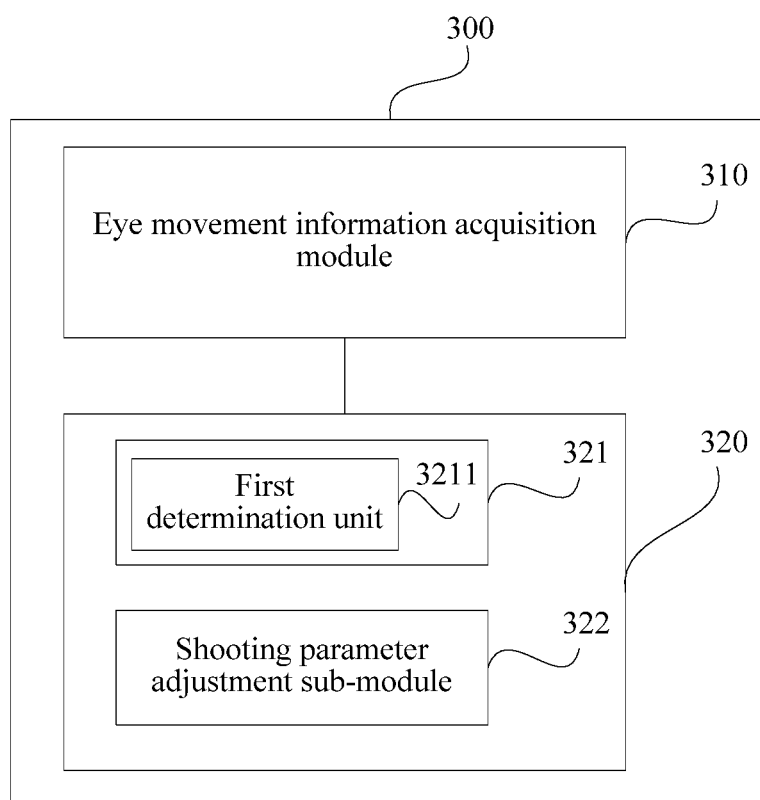

As shown in FIG. 4c, in one example embodiment, the relative movement determination sub-module 321 comprises:

a first determination unit 3211, configured to determine the relative movement information at least according to the non-saccade eye movement part and at least one piece of reference non-saccade eye movement information.

The at least one piece of reference non-saccade eye movement information, for example, may be: a non-saccade eye movement part in the eye movement information acquired by the user through a current gaze action in a condition of being static relative to the image capturing equipment.

In one example embodiment, the first determination unit 321 may be further configured to:

compare the non-saccade eye movement part with reference non-saccade eye movement information in the at least one piece of reference non-saccade eye movement information which corresponds to the eye movement information, to determine the relative movement information according to their difference.

Figure 4D:
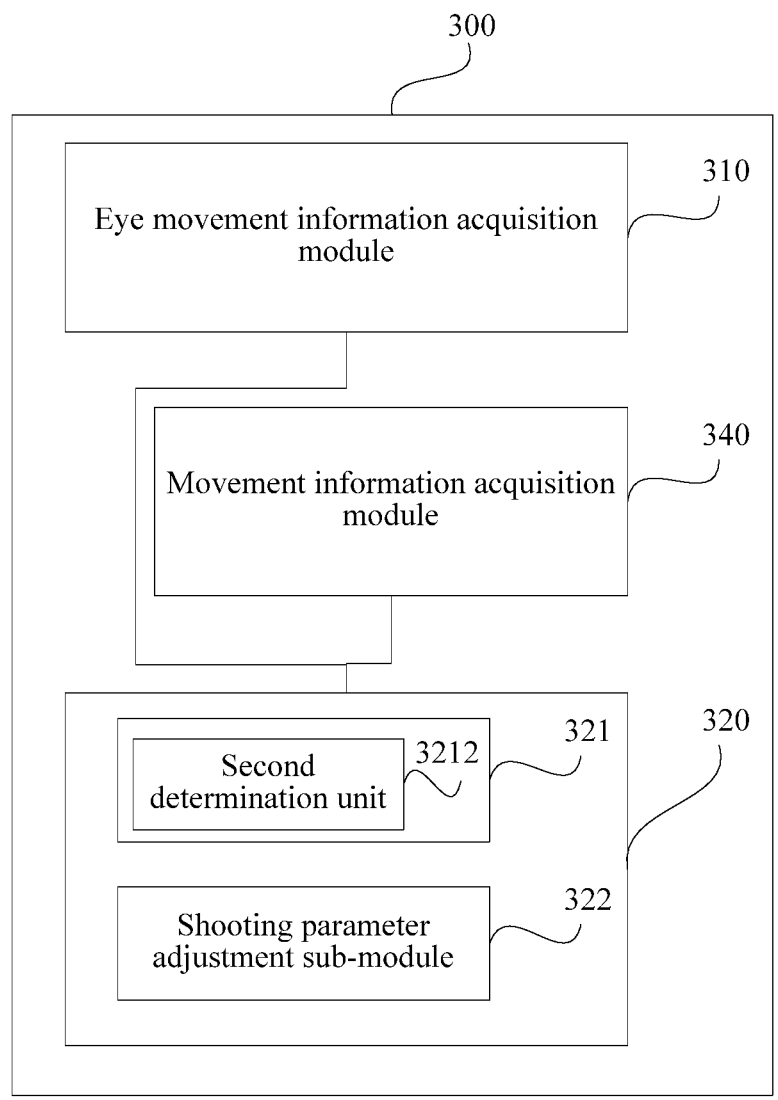

As shown in FIG. 4d, in one example embodiment, the relative movement determination sub-module 321 may comprise:

a second determination unit 3212, configured to determine the relative movement information at least according to the non-saccade eye movement part and movement information of the image capturing equipment corresponding to the period corresponding to the non-saccade eye movement part.

In the example embodiment, optionally, the apparatus 300 further comprises: a movement information acquisition module 340, configured to acquire the movement information.

Herein, the movement information, for example, may be at least one inertial sensing information of the user equipment, and it is feasible to acquire the information through at least one inertial sensor of the user equipment. The at least one inertial sensor, for example, may comprise at least one of the following:

at least one acceleration sensor, at least one gyroscope, at least one magnetic sensor, at least one gravity sensor and the like.

The movement information, for example, may comprise the at least one inertial sensing information captured by the at least one inertial sensor.

In one example embodiment, when the movement information acquisition module 340 is located at the side of the image capturing equipment, the movement information acquisition module 340, for example, may further comprise:

the at least one inertial sensor, configured to acquire the movement information.

In another example embodiment, for example, when the movement information acquisition module 340 is not at the side of the image capturing equipment, the movement information acquisition module 340 may further comprise:

a communication unit, configured to acquire the movement information from at least one external device through communication.

Herein, the at least one external device, for example, may comprise the image capturing user equipment.

Figure 4E:
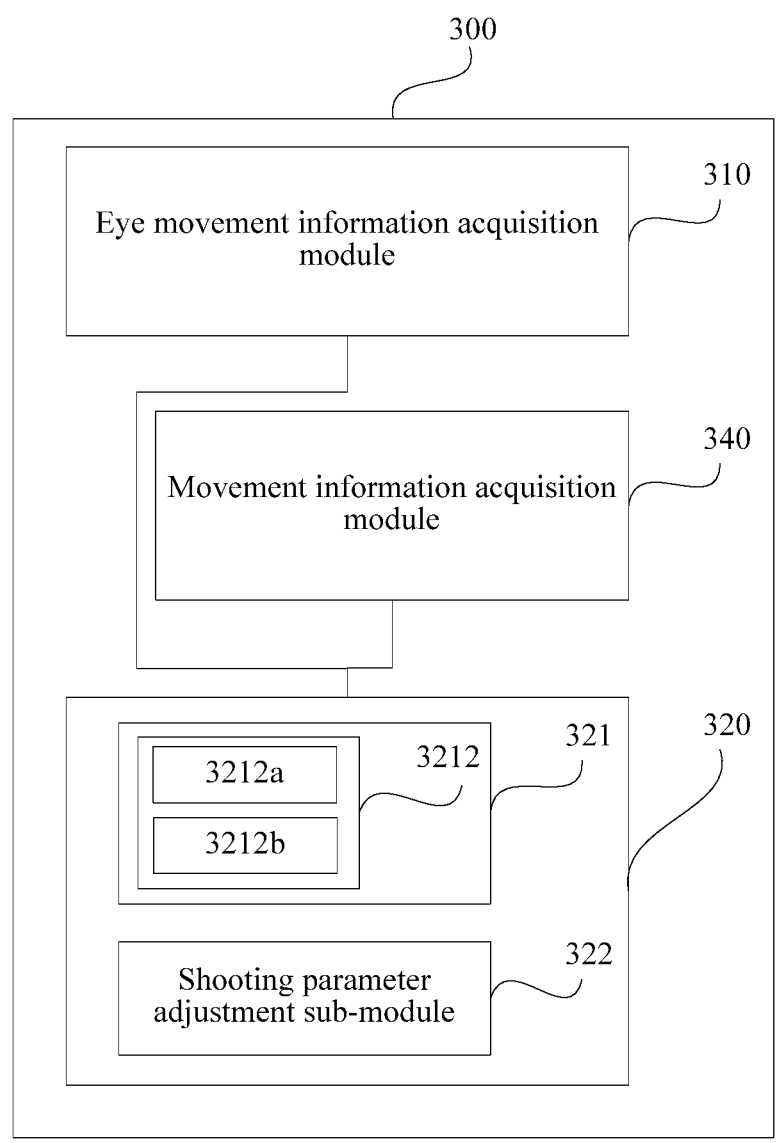

As shown in FIG. 4e, in one example embodiment, optionally, the second determination unit 3212 may comprise:

a first determination sub-unit 3212a, configured to determine eye movement components of the non-saccade eye movement part corresponding to at least one movement feature of the movement information; and a second determination sub-unit 3212b, configured to determine the relative movement information at least according to the eye movement components.

In one example embodiment, the at least one movement feature may comprise at least one of the following:

movement change frequency feature, movement change amplitude feature and movement change phase feature.

The embodiment of the present application may more accurately determine the relative movement information between the user and the image capturing equipment according to the respective example embodiments, the relative movement information can be applied to multiple aspects and bring better user experience to the user. For example, a relative movement law between the user and the image capturing equipment in a latter period may be predicted according to the relative movement information between the user and the image capturing equipment, and further corresponding operation may be performed.

In one example embodiment, the shooting parameters corresponding to the user shooting, for example, may be the shooting parameters of the user for selfie by the image capturing device.

In another example embodiment, the shooting parameters corresponding to the user shooting, for example, may be the shooting parameters corresponding to shooting the user by other users using the image capturing equipment.

In one example embodiment, the shooting parameters are shooting shake preventing parameters of the image capturing equipment.

For example, in one example embodiment, the image capturing equipment performs shake preventing by a compensating lens. In the present embodiment, the shooting parameters for example can be shifting parameters of the compensating lens, and an effect caused by the relative movement is compensated by shifting of the compensating lens.

In one example embodiment, the image capturing equipment performs shake preventing by an imaging sensor. In the example embodiment, the shooting parameters may be for example shifting parameters of the imaging sensor, for example a Charge-Coupled Device (CCD), and the effect caused by the relative movement is compensated by shifting of the imaging sensor.

In other example embodiments, other parameters for relieving the effect caused by the relative movement of the image capturing equipment may also be applied in the present example embodiment. For example, in one example embodiment, the shooting parameters may comprise: a shutter speed, a photosensibility (ISO value) and a focusing manner. For example, in one example embodiment, when the relative movement is more obvious, the photosensibility is higher and the shutter speed is faster.

Of course, in some example embodiments, the image capturing equipment has many shake preventing ways, therefore, the shooting parameters comprise a plurality of above shooting parameters.

Those skilled in the art can see that, the present application performs shooting shake compensating on the relative movement, to further cause the user to still obtain a better selfie image effect when the user moves relative to the image capturing equipment, and improve user experience.

Further description about functions of each module and unit in the embodiment of the present application refer to the corresponding description in the embodiment as shown in FIG. 1.

Figure 5:
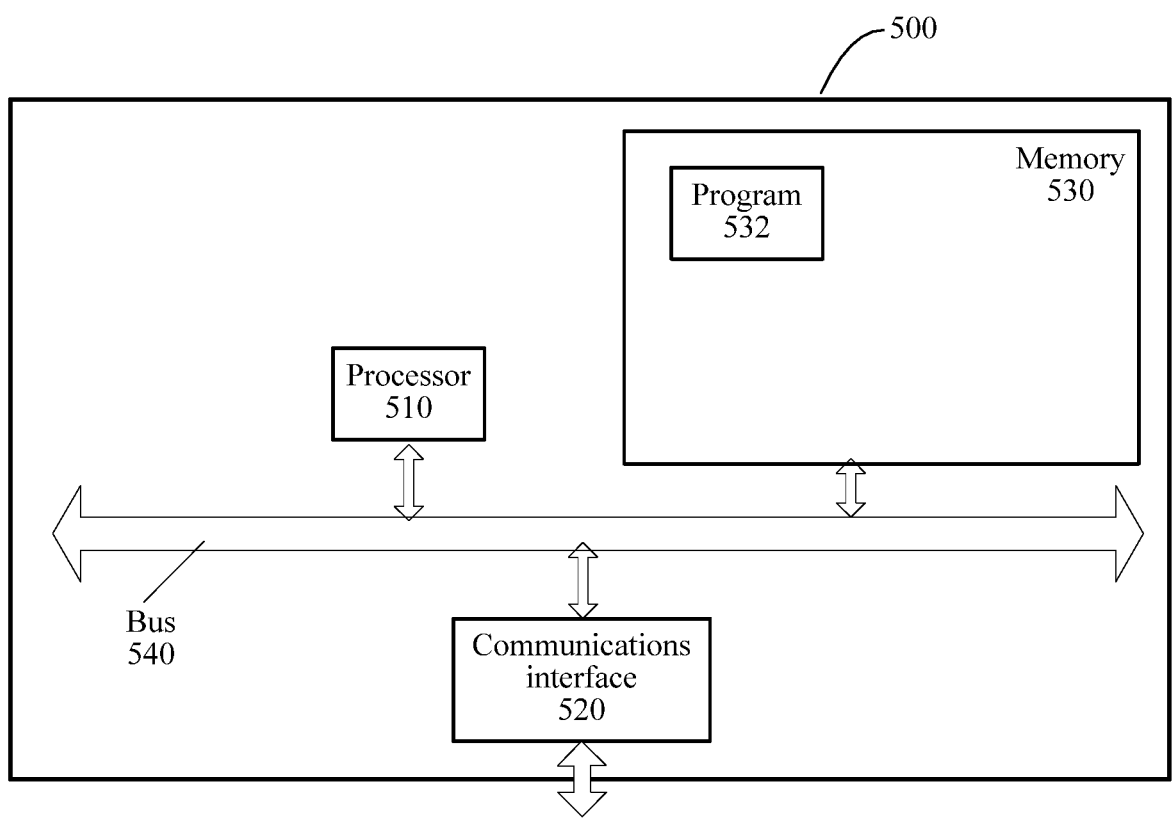
FIG. 5 is a structural schematic block diagram of a user equipment according to an example embodiment of the present application.

FIG. 5 is a schematic structural diagram of a user equipment 500 according to an embodiment of the present application; the specific embodiment of the present application does not limit implementation of the user equipment 500. As shown in FIG. 5, the user equipment 500 may comprise:

a processor 510, a communications interface 520, a memory 530, and a communications bus 540.

The processor 510, the communications interface 520, and the memory 530 communicate with each other via the communications bus 540.

The communications interface 520 is configured to communicate with, for example, a network element such as a client.

The processor 510 is configured to run a program 532, and specifically can perform the related steps in the foregoing method embodiments.

For example, the program 532 may comprise program code, wherein the program code comprises a computer operating instruction.

The processor 510 may be a central processing unit (CPU), or an application specific integrated circuit (ASIC), or one or more integrated circuits configured to implement the embodiments of the present application.

The memory 530 is configured to store the program 532. The memory 530 may comprise a random access memory (RAM), or further comprise a non-volatile memory, for example, at least one magnetic disk memory. The program 532 can be specifically configured to cause the user equipment 500 to perform the following operations of:

acquiring eye movement information related to that at least one eye of a user gazes a user equipment; and adjusting shooting parameters of the user equipment at least according to a non-saccade eye movement part in the eye movement information, wherein the shooting parameters related to that the image capturing equipment shoots the user.

Alternatively, in another example embodiment, the program 532 can be specifically configured to cause the user equipment 500 to perform the following operations of:

acquiring eye movement information related to that at least one eye of a user gazes a image capturing equipment; and adjusting shooting parameters of the image capturing equipment at least according to a non-saccade eye movement part in the eye movement information, wherein the shooting parameters related to that the image capturing equipment shoots the user.

For the specific implementation of the steps in the program 532, reference may be made to the corresponding descriptions in the corresponding steps and units in the foregoing embodiments, which are not described herein again. It may be clearly understood by a person skilled in the art that, for the purpose of convenient and brief description, reference may be made to the description of corresponding procedures in the foregoing method embodiments for detailed working procedures of the foregoing devices and modules, which are not described herein again.

A person of ordinary skill in the art may be aware that, units and method steps of the examples that are described in conjunction with the embodiments disclosed in this specification may be implemented by electronic hardware or a combination of computer software and electronic hardware. Whether the functions are performed by hardware or software depends on particular applications and design constraint conditions of the technical solution. A person skilled in the art may use different methods to implement the described functions for each particular application, but it should not be considered that the implementation goes beyond the scope of the present application.

When the functions are implemented in a form of a software functional unit and sold or used as an independent product, the functions may be stored in a computer-readable storage medium. Based on such an understanding, the technical solutions of the present application essentially, or the part contributing to the prior art, or a part of the technical solutions may be implemented in a form of a software product. The computer software product is stored in a storage medium and comprises several instructions for instructing a computer device (which may be a personal computer, a controller, a network device, or the like) to perform all or some of the steps of the methods described in the embodiments of the present application. The foregoing storage medium comprises: any medium that can store program code, such as a USB flash drive, a removable hard disk, a read-only memory (ROM), a random access memory (RAM), a magnetic disk, or an optical disc.

The foregoing example embodiments are merely used to describe the present application, but are not intended to limit the present application. A person of ordinary skill in the art may further make various variations and modifications without departing from the spirit and scope of the present application. Therefore, all the equivalent embodiments also fall within the scope of the present application, and the patent protection scope of the present application should be defined by the claims.

What is claimed is:

1. A method, comprising:
acquiring eye movement caused by unintended relative movement between a head of a user and an image capturing equipment, the eye movement being related to determining that an eye of the user gazes at the image capturing equipment;
determining the unintended relative movement between the head of the user and the image capturing equipment at least according to a non-saccade eye movement part in the eye movement information and movement information of the image capturing equipment corresponding to a period corresponding to the non-saccade eye movement part, wherein the determining of the unintended relative movement comprises:
determining eye movement components of the non-saccade eye movement part having a changing frequency corresponding to a movement change frequency feature of the movement information; and
determining a relative movement at least according to the eye movement components; and
adjusting shooting parameters of the image capturing equipment to reduce an effect of the unintended relative movement on shooting, wherein the shooting parameters are related to determining that the image capturing equipment shoots the user.

2. The method of claim 1, further comprising:
processing the eye movement information to obtain the non-saccade eye movement part.

3. The method of claim 1, wherein the non-saccade eye movement part comprises:
a smooth pursuit eye movement part.

4. The method of claim 3, wherein the non-saccade eye movement part further comprises:
a fixation eye movement part.

5. The method of claim 1, wherein the shooting parameters comprise at least one of:
a compensating lens shifting parameter, an imaging sensor shifting parameter, a shutter speed parameter or a photosensibility parameter.

6. The method of claim 1, wherein the determining the unintended relative movement at least according to the non-saccade eye movement part comprises:

determining the unintended relative movement at least according to the non-saccade eye movement part and at least one piece of reference non-saccade eye movement information.

7. The method of claim 1, further comprising:
before the determining the unintended relative movement at least according to the non-saccade eye movement part, acquiring the movement information.

8. An apparatus, comprising:
a memory that stores executable modules; and
a processor, coupled to the memory, that executes or facilitates execution of the executable modules, the executable modules comprising:
   an eye movement information acquisition module configured to acquire eye movement caused by unintended relative movement between a head of a user and an image capturing equipment, the eye movement being related to that at least one eye of the user is gazing at the image capturing equipment; and
   a shooting parameter adjustment module configured to:
      determine the unintended relative movement between the head of the user and the image capturing equipment at least according to a non-saccade eye movement part in the eye movement information and movement information of the image capturing equipment corresponding to a period corresponding to the non-saccade eye movement part, wherein determination of the unintended relative movement by the shooting parameter adjustment module comprises:
         a first determination of eye movement components of the non-saccade eye movement part having a changing frequency corresponding to a movement change frequency feature of the movement information; and
         a second determination of a relative movement at least according to the eye movement components; and
      adjust shooting parameters of the image capturing equipment to reduce an effect of the unintended relative movement on shooting, wherein the shooting parameters are related to that the image capturing equipment shoots the user.

9. The apparatus of claim 8, wherein the executable modules further comprise:
an eye movement information processing module configured to process the eye movement information to obtain the non-saccade eye movement part.

10. The apparatus of claim 8, wherein the non-saccade eye movement part comprises:
a smooth pursuit eye movement part.

11. The apparatus of claim 10, wherein the non-saccade eye movement part further comprises:
a fixation eye movement part.

12. The apparatus of claim 8, wherein the shooting parameters comprise at least one of:
a compensating lens shifting parameter, an imaging sensor shifting parameter, a shutter speed parameter or a photosensibility parameter.

13. The apparatus of claim 8, wherein the shooting parameter adjustment module comprises:
a determination unit configured to determine the unintended relative movement at least according to the non-saccade eye movement part and at least one piece of reference non-saccade eye movement information.

14. The apparatus of claim 8, wherein the executable modules further comprise:
a movement information acquisition module configured to acquire the movement information.

15. A user equipment, comprising:
an image sensor configured to shoot;
a memory configured to store a program; and
a processor configured to execute the program stored by the memory, the program causing the processor to perform operations, comprising:
   acquiring eye movement caused by unintended relative movement between a head of a user and the user equipment, the eye movement being related to a determination that an eye of the user is gazing at the user equipment;
   determining the unintended relative movement between the head of the user and the image sensor at least according to a non-saccade eye movement part in the eye movement information and movement information of the image capturing equipment corresponding to a period corresponding to the non-saccade eye movement part, wherein the determining of the unintended relative movement comprises:
      determining eye movement components of the non-saccade eye movement part having a changing frequency corresponding to a movement change frequency feature of the movement information; and
      determining a relative movement at least according to the eye movement components; and
   adjusting shooting parameters of the user equipment to reduce an effect of the unintended relative movement on shooting.

16. An image capturing equipment, comprising:
a memory configured to store a program; and
a processor configured to execute the program stored by the memory, the program causing the processor to perform operations, comprising:
   acquiring eye movement caused by unintended relative movement between a head of a user and the image capturing equipment, the eye movement being related to at least one eye of the user being determined to be gazing at the image capturing equipment;
   determining the unintended relative movement between the head of the user and the image capturing equipment based on input from the user at least according to a non-saccade eye movement part in the eye movement information and movement information of the image capturing equipment corresponding to a period corresponding to the non-saccade eye movement part, wherein the determining of the unintended relative movement comprises:
      determining eye movement components of the non-saccade eye movement part having a changing frequency corresponding to a movement change frequency feature of the movement information; and
      determining a relative movement at least according to the eye movement components; and
   adjusting shooting parameters of the image capturing equipment to reduce an effect of the unintended relative movement on shooting.

17. The user equipment of claim 15, wherein the non-saccade eye movement part comprises a smooth pursuit eye movement part.

18. The image capturing equipment of claim 16, wherein the non-saccade eye movement part comprises a smooth pursuit eye movement part.

19. The user equipment of claim 15, wherein the operations further comprise:
   processing the eye movement information to obtain the non-saccade eye movement part.

20. The image capturing equipment of claim 16, wherein the operations further comprise:
   processing the eye movement information to obtain the non-saccade eye movement part.

21. The user equipment of claim 15, wherein the non-saccade eye movement part further comprises:
   a fixation eye movement part.

22. The image capturing equipment of claim 16, wherein the non-saccade eye movement part further comprises:
   a fixation eye movement part.

23. The user equipment of claim 15, wherein the shooting parameters comprise at least one of:
   a compensating lens shifting parameter, an imaging sensor shifting parameter, a shutter speed parameter or a photosensibility parameter.

24. The image capturing equipment of claim 16, wherein the shooting parameters comprise at least one of:
   a compensating lens shifting parameter, an imaging sensor shifting parameter, a shutter speed parameter or a photosensibility parameter.

* * * * *